United States Patent [19]

Matthews

[11] 3,784,146
[45] Jan. 8, 1974

[54] HORIZONTAL VIBRATION ISOLATION SYSTEM

[76] Inventor: John W. Matthews, 17635 San Diego Cir., Fountain Valley, Calif.

[22] Filed: Apr. 24, 1972

[21] Appl. No.: 247,122

[52] U.S. Cl.............. 248/358 R, 108/136, 248/22, 248/188.8
[51] Int. Cl......................................... F16m 11/22
[58] Field of Search .................. 248/20, 21, 22, 24, 248/358 R, 358 A, 188.8; 108/136; 188/1 B; 267/136, 137

[56] References Cited
UNITED STATES PATENTS

| | | | |
|---|---|---|---|
| 3,355,051 | 11/1967 | Kloeckner et al........... | 248/358 R X |
| 3,586,272 | 6/1971 | Pestell................................. | 248/22 |
| 3,595,503 | 7/1971 | Tidblad.......................... | 108/136 X |
| 3,371,895 | 3/1968 | Speranza............................. | 248/20 |
| 2,148,937 | 2/1939 | Gerb................................. | 248/20 X |
| 3,627,246 | 12/1971 | Widding.......................... | 248/188.8 |

*Primary Examiner*—J. Franklin Foss
*Attorney*—Nilsson, Robbins, Wills & Berliner

[57] ABSTRACT

A horizontal vibration isolation system including a hollow piston defining a chamber closed by a top plate which is formed with a central aperture. An internal plate is suspended in the chamber by a plurality of cables secured between the top plate and the internal plate which supports a connecting rod which protrudes axially through the aperture in the top plate. The protruding end of the connecting rod is formed to be secured to the bottom surface of the member which is to be isolated from horizontal vibrations. The chamber may be filled with oil for damping the horizontal motion of the system at resonance. The cables may be solid metallic rods or be formed of braided wire. Each cable is swaged at its lower end, e.g., with a ball end, which fits into a hole therefor formed in the internal plate. The cables are adjustably secured to the top plate for aligning the internal plate to a desired horizontal position. In operation, a plurality of the pistons are provided, each of the pistons being secured to a bottom surface of the isolated member. Each of the pistons may be supported on a flexible diaphragm which provides vertical isolation of the vibrations, the diaphragm also forming the sealing surface of a fluid chamber, the fluid being a compressible gas such as air or nitrogen.

10 Claims, 4 Drawing Figures

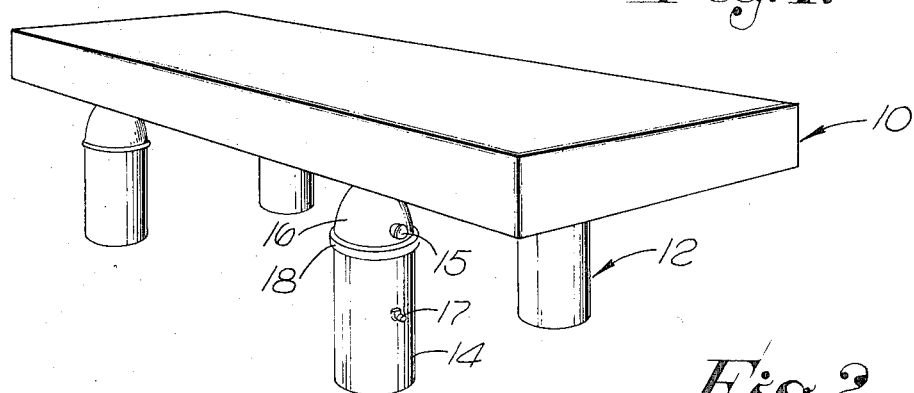
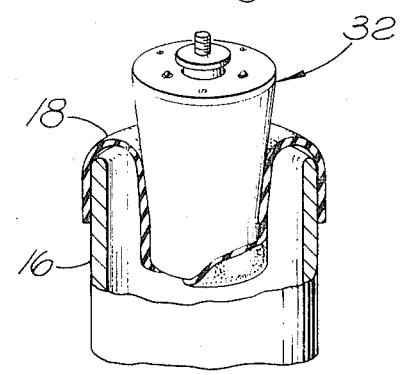
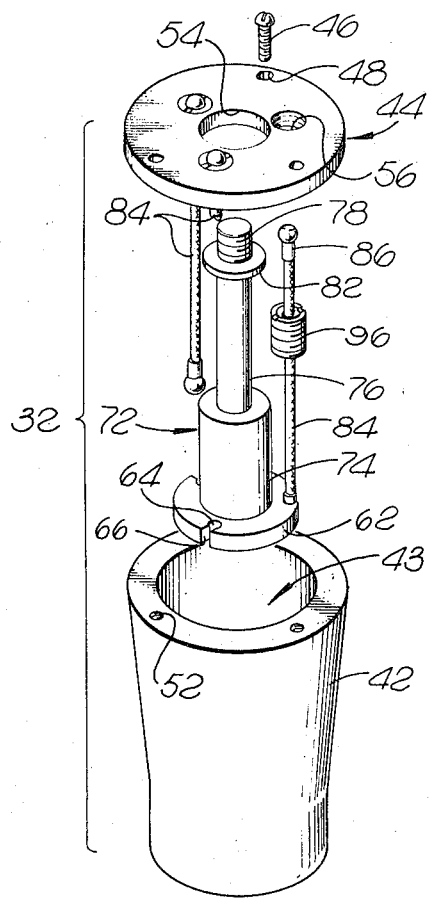

3,784,146

HORIZONTAL VIBRATION ISOLATION SYSTEM

FIELD OF THE INVENTION

The field of art to which the invention pertains includes the field of vibration isolation, particularly with respect to table systems such as optical tables wherein it is necessary to mount the table on a support which is subject to vibrations.

BACKGROUND AND SUMMARY OF THE INVENTION

A variety of vibration isolation systems are available and are of particular interest herein. The vibration isolation systems include a plurality of pneumatic isolation mounts, each formed of an air housing having a piston chamber which is covered with a rubber sheeting, commonly referred to as a diaphragm. A piston is placed atop the rubber sheeting to force the sheeting into the chamber. Normally the piston is fitted with a screw mount for attachment to the table. In general sufficient vertical isolation is provided by the air chamber system. In addition, some horizontal vibration isolation is also provided by the flexible rubber sheeting.

The rubber sheeting provides excellent isolation for vertical vibrations but does not adequately isolate vibrations occuring in the horizontal direction. Attempts to make such a diaphragm system more effective with horizontal vibrations have either resulted in reduced performance in the vertical direction or in poor stability in the horizontal direction. Prior art systems which provide isolation for horizontal vibrations are usually complex and require large amounts of linkages, but still do not perform satisfactorily with horizontal vibrations. Patents of interest include U.S. Pat. Nos. 2,717,134, 3,334,848, 3,371,895 and 3,578,278.

The present invention provides an improved horizontal vibration isolation system which overcomes the disadvantages of prior art systems and which may be incorporated into prior art vertical vibration isolation systems. The invention can be incorporated in a diaphragm type of vibration isolation system without requiring major changes in the diaphragm design or external piston shape.

Specifically, the vibration isolation system incorporates a hollow piston which defines a chamber enclosed by a top plate and having a central aperture through the top plate. An internal plate is suspended in the chamber which is secured to a plurality of support cables secured between the top plate and the internal plate and supports a connecting rod which protrudes axially through the aperture in the top plate. The protruding end of the connecting rod is formed to be secured to the bottom surface of a member which is to be isolated from horizontal vibrations. The chamber of the piston may be filled with oil for damping the motion of the system at resonance. The cables may be formed as solid metallic rods or as a plurality of braided wires. Each of the cables may be swaged at its lower end with ball ends, which fit into holes in the internal plate. The cables are adjustably secured at their top ends to the top plate for aligning the internal plate to a desired horizontal position. The protruding ends of the piston rods may be threadably secured to the bottom surface of the member with the pistons supported on flexible diaphragms to provide both horizontal and vertical vibration isolation. In operation, a piston is utilized at each point where the member or table is supported.

The advantages of this invention, both as to its construction and mode of operation, will be readily appreciated as the same becomes better understood by reference to the following detailed description when considered in connection with the accompanying drawings in which like reference numerals designate like parts throughout the figures.

BRIEF DESCRIPTION OF THE DRAWINGS

FIG. 1 is a perspective view of a prior art vibration isolation system;

FIG. 2 is a plan view, partly in section, of a portion of the prior art vibration isolation system of FIG. 1 incorporating the horizontal vibration isolation system of the present invention;

FIG. 3 is an exploded perspective, partially cut-away view of the vibration isolation system of the present invention; and FIG. 4 is a sectional side view of the vibration isolation system of the present invention showing a portion only of the mechanism.

DETAILED DESCRIPTION

Referring now to FIG. 1, there is shown a conventional prior art vibration isolation system for use with a table such as an optical table 10 which is supported on three or more diaphragm pneumatic isolation mounts 12. The lower portion of each mount includes an air housing 14 and the top portion includes a piston chamber 16. The piston chamber 16 is covered with a rubber sheeting or diaphragm 18 which communicates with the air housing 14. Valving 15 and air hose connections 17 are provided, which cooperate with a suitable supply of compressed air, not shown. A piston (not shown in FIG. 1, but having the general external configuration shown in FIG. 2) is placed atop the rubber sheeting 18 and causes the piston to drop into the rubber sheeting and push the rubber sheeting into the chamber 16, as illustrated in FIG. 2. The top of the piston is fitted with a screw mount for attachment to the bottom surface of the table. Such a piston provides vertical vibration isolation by means of the air chamber and provides a limited degree of horizontal vibration isolation by means of the flexible rubber sheeting. However, it has been found that such an arrangement does not adequately attenuate horizontal vibrations.

Referring now to FIG. 2 there is shown a horizontal vibration isolation system which can be incorporated into the design of FIG. 1. In FIG. 2 the piston which is used to connect the mounts 12 to the table 10 is replaced by a new type of piston 32 which is generally the same size as the piston utilized in the system of FIG. 1. The piston 32 is also positioned atop the rubber sheeting 18 which is used to cover the piston chamber 16 and includes a screw threaded, protruding mounting rod 72 for connection to the table 10, as will hereinafter be described.

Referring now FIGS. 3 and 4 the piston 32 which may be used to replace the pistons in the mounts 12 of FIG. 1 is shown in greater detail. The piston is formed of a wall 42 which is externally conical over most of its length and internally cylindrical to define a chamber 43 which is closed at its bottom end 45. The chamber 43 is enclosed at its top end by a plate 44 having a central aperture 54 therethrough. The plate 44 may be secured to the chamber wall 42 by means of a plurality of screws 46 which are threaded through openings 48 in the plate and are secured in threaded openings 52 of the chamber. The top plate 44 further contains a plurality of threaded openings 56 which are spaced equidistant from the center of the aperture 54 and inwardly from the openings 48 of the top plate.

Positioned in the chamber 43 is an internal annular plate 62 having a plurality of equidistant spaced apart openings 64 therein. The openings 64 are extended to the outer periphery of the annular plate by means of slots or keys 66 of narrower widths. The bottom surfaces of the openings 64 have beveled faces 68. On the upper surface of the internal annular plate 62 there is mounted a rod member 72 having an enlarged diameter lower section 74 and a smaller diameter upper section 76. The sections 74 and 76 are joined together to form a long rod with the bottom of the surface of the section 74 being integrally formed with the annular plate 62. The top of the reduced diameter section 76 is formed with a threaded end 78 and a flange 82 is formed spaced downwardly therefrom. The threaded end 78 is used to secure the piston 32 to a table, such as the table 10 shown in FIG. 1, with the top surface of the flange 82 abutting the table. Normally the flange 82 has an outer diameter slightly smaller than the diameter of the aperture 54 so as to allow the flange 82 to pass through the aperture 54.

The piston 32 further contains three cables 84, each 120° apart, which may be solid rods e.g., of metal or as illustrated, may be formed of braided wire. The upper ends of the cables 84 are formed with a sleeve 86 terminating in an enlarged ball portion 88 integral therewith. Each cable 84 terminates at its lower end with a bottom sleeve 92 having an enlarged ball portion 94 integral therewith. Positioned on each of the cables 84 is a cylindrical member 96 which is slidably movable on the cable 94 but whose inner diameter is smaller than that of the balls 88 and 94 so as to prevent the cylinders 96 from being removed from the cable. The outer surface of each cylindrical member 96 is formed with a thread, so as to enable the cylindrical members 96 to be threaded into the openings 56 of the top plate 44. The top surface of each cylindrical member 96 is slotted to facilitate adjustment of its positon in the openings 56.

The piston 32 is assembled by inserting the cables 84 into the slots 66 whereby the ball members 94 abut the downward facing beveled face 68 of the annular plates. The cylindrical rod 72 is then lowered into the housing 42. The top plate aperture 54 is slightly larger than the flange member 82 so that the top plate can then be positioned on the housing 42 and secured thereto by means of screws 46. The cylindrical members 96 are threaded into the openings 56 and may be adjusted so that the internal annular plate 62 is in a horizintal position in initial assembly. The enlarged top ball members 88 prevent the cable 84 from passing through the cylindrical members 96.

The chambers 42 is normally partially filled with a viscous fluid such as an oil, not shown, to aid in damping. The piston 32 provides horizontal vibration isolation by means of the cable supported movement of the support rods 84 through the top plate aperture 54. Such movement is limited by the size of the aperture 54 and the diameter of the upper rod section 76 so that tipping of the table 10 is prevented. The cable support system shown in FIGS. 3 and 4 is rigid in the vertical direction but vertical vibration isolation is provided when the piston 32 is mounted in the arrangement shown in FIG. 2 by means of the rubber sheet 18. As can be readily seen, the piston 32 can be displaced horizontally with very little force. Put another way, the spring contant in the horizontal direction is very low, resulting in very efficient isolation of horizontal vibrations. Moreover, by utilizing greater length cables and increasing the lengths of the chamber 42, greater horizontal vibration isolation can be achieved.

The invention provides superior horizontal vibration isolation combined with ease of implementation and manufacture. The use of the cable system provides excellent horizontal vibration isolation and works for both low amplitude motions as well as moderate to large amplitude motions, unlike systems employing ball bearing or similar devices which must overcome static friction. While the invention has been depicted as being incorporated into a conventional vibration isolation system it should be understood that the system can be utilized in cooperation with other systems where only horizontal motions are anticipated.

I claim

1. A vibration isolation system for isolating a member from horizontal vibrations, comprising:
   a piston supportable below said member;
   an isolation member coaxial with said piston and formed at its top end to be secured to said first-mentioned member, said isolation member comprising a support rod;
   a plurality of cables;
   means for securing the tops of said cables to said piston at a region at the top thereof; and
   means for securing the bottoms of said cables to said isolation member at a region spaced from the top end thereof so that said piston supports said isolation member via said cables and comprises a plate secured to said support rod.

2. A vibration isolation system in accordance with claim 1 wherein:
   said piston is hollow and defines a chamber internally thereof;
   said cables are within said chamber;
   said means for securing the tops of said cables comprises a top plate enclosing said chamber and having a central aperture therethrough;
   said isolation member comprises a chamber having said support rod therein, the top end of said support rod extending axially through the aperture in said top plate; and
   wherein said means for securing the bottoms of said cables comprises said plate internally suspended in said chamber.

3. A vibration isolation system in accordance with claim 2 wherein said chamber is closed at its bottom end and contains a viscous fluid for damping movement of said internal plate.

4. A vibration isolation system in accordance with claim 2 wherein said cables are formed as solid rods.

5. A vibration isolation system in accordance with claim 1 wherein said cables are formed as braided wires.

6. A vibration isolation system in accordance with claim 2 wherein each of said cables is terminated at one end with ball ends which fit into holes in said internal plate.

7. A vibration isolation system in accordance with claim 2 wherein said cables are adjustably secured to said top plate for aligning said internal plate to a desired horizontal position.

8. A vibration isolation system in accordance with claim 2 wherein a plurality of pistons are provided, each of said pistons being secured to the bottom surface of said member.

9. A vibration isolation system in accordance with claim 8 wherein each of said pistons is supported on a flexible diaphragm which provides vertical isolation of vibrations.

10. A vibration isolation system in accordance with claim 9 wherein said diaphragm forms the sealing surface of a fluid chamber, the fluid being a compressible gas such as air or nitrogen.

* * * * *